United States Patent
Brunk et al.

(10) Patent No.: US 10,862,967 B2
(45) Date of Patent: *Dec. 8, 2020

(54) PROVIDING HIGH PERFORMANCE MULTI-TIERED CLOUD STORAGE BASED ON THE PERFORMANCE CRITERIA OF A CUSTOMER

(71) Applicant: CenturyLink Intellectual Property LLC, Broomfield, CO (US)

(72) Inventors: Robert Brunk, Roswell, GA (US); Kenneth Suda, Roswell, GA (US); James B. Farman, Herndon, VA (US); William T. Prange, Arlington, TX (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/459,011

(22) Filed: Jul. 1, 2019

(65) Prior Publication Data
US 2019/0327304 A1      Oct. 24, 2019

Related U.S. Application Data

(63) Continuation of application No. 13/915,153, filed on Jun. 11, 2013, now Pat. No. 10,341,435.
(Continued)

(51) Int. Cl.
*H04L 29/08*   (2006.01)
*G06F 3/06*   (2006.01)

(52) U.S. Cl.
CPC ........ *H04L 67/1097* (2013.01); *G06F 3/0605* (2013.01); *G06F 3/067* (2013.01); *G06F 3/0631* (2013.01); *G06F 3/0685* (2013.01)

(58) Field of Classification Search
CPC . H04L 67/1097; G06F 3/0605; G06F 3/0631; G06F 3/067; G06F 3/0685
See application file for complete search history.

(56) References Cited

U.S. PATENT DOCUMENTS

| | | | | |
|---|---|---|---|---|
| H696 H | * | 10/1989 | Davidson | ........................ 710/46 |
| 5,960,451 A | * | 9/1999 | Voigt | .................... G06F 3/0605 |
| | | | | 360/902 |

(Continued)

FOREIGN PATENT DOCUMENTS

WO      WO-2013188382      12/2013

OTHER PUBLICATIONS

Bhuvan Urgaonkar et al., "Dynamic Provisioning of Multi-tier Internet Applications," Autonomic Computing 2005. pp. 217-228, Jun. 13-16, 2005.

(Continued)

*Primary Examiner* — Daniel C. Murray

(57) ABSTRACT

This document discloses high performance data storage solutions. In an aspect, some solutions can be employed in a cloud-computing environment that provides shared storage for a plurality of customers. In other aspects, the solutions provided by some embodiments can provide multiple tiers of storage, each having a different performance level. This feature can provide a customer with the ability (e.g., through a web portal) to design its own custom storage solution that blends multiple tiers of storage at different capacity and performance levels to attain an optimal level of capacity, performance, and cost. Some disclosed solutions provide a novel arrangement of different types of storage devices that are provisioned through a common API, which can access each storage device's native management interface, as well as the host computer for which the storage will be provi- (Continued)

sioned, to allocate multiple tiers of storage to the host computer in an automated manner.

20 Claims, 7 Drawing Sheets

Related U.S. Application Data

(60) Provisional application No. 61/658,772, filed on Jun. 12, 2012.

(56) References Cited

U.S. PATENT DOCUMENTS

| | | | |
|---|---|---|---|
| 6,304,980 B1 * | 10/2001 | Beardsley | G06F 11/2064 707/999.202 |
| 6,728,780 B1 | 4/2004 | Hebert | |
| 6,801,992 B2 | 10/2004 | Gajjar et al. | |
| 7,401,338 B1 | 7/2008 | Bowen et al. | |
| 7,506,040 B1 | 3/2009 | Rabe et al. | |
| 7,606,934 B1 * | 10/2009 | Vengerov | G06F 3/0611 706/21 |
| 8,117,235 B1 * | 2/2012 | Barta | G06F 3/061 707/802 |
| 8,443,163 B1 * | 5/2013 | Bailey | G06F 3/064 711/170 |
| 8,555,018 B1 | 10/2013 | Rohr | |
| 8,555,021 B1 * | 10/2013 | Barturen | G06F 3/061 711/170 |
| 8,930,668 B2 * | 1/2015 | Engle | G06F 3/0631 711/170 |
| 8,972,694 B1 * | 3/2015 | Dolan | G06F 3/0685 711/172 |
| 9,026,760 B1 * | 5/2015 | Marshak | G06F 3/0689 711/165 |
| 9,158,458 B2 * | 10/2015 | Umbehocker | G06F 3/0631 |
| 9,344,401 B2 * | 5/2016 | Umbehocker | G06F 3/0604 |
| 9,361,595 B2 * | 6/2016 | Karve | G06Q 10/06315 |
| 9,411,530 B1 * | 8/2016 | Bailey | G06F 3/0619 |
| 9,519,595 B1 * | 12/2016 | Zeldin | G06F 3/0644 |
| 9,578,100 B2 * | 2/2017 | Umbehocker | G06F 3/0605 |
| 9,785,353 B1 * | 10/2017 | Marshak | G06F 3/061 |
| 9,952,803 B1 * | 4/2018 | Dolan | G06F 3/0653 |
| 10,025,734 B1 | 7/2018 | Caruso | |
| 10,192,065 B2 * | 1/2019 | Iyer | G06F 3/0631 |
| 10,225,162 B1 * | 3/2019 | Jain | G06F 3/0605 |
| 10,725,707 B2 * | 7/2020 | Greenwood | G06F 3/0685 |
| 2005/0120160 A1 | 6/2005 | Plouffe | |
| 2006/0047930 A1 | 3/2006 | Takahashi et al. | |
| 2006/0209718 A1 | 9/2006 | Kinsey et al. | |
| 2010/0049917 A1 | 2/2010 | Kono et al. | |
| 2010/0281201 A1 | 11/2010 | O'Brien et al. | |
| 2010/0332401 A1 * | 12/2010 | Prahlad | H04L 63/0428 705/80 |
| 2010/0332456 A1 | 12/2010 | Prahlad et al. | |
| 2011/0289287 A1 * | 11/2011 | Yamamoto | G06F 3/0685 711/156 |
| 2012/0317366 A1 * | 12/2012 | Sato | G06F 3/1433 711/141 |
| 2013/0024481 A1 * | 1/2013 | Bolesta | G06F 3/0629 707/812 |
| 2013/0073702 A1 * | 3/2013 | Umbehocker | G06F 3/067 709/222 |
| 2013/0332614 A1 | 12/2013 | Brunk et al. | |
| 2015/0006665 A1 * | 1/2015 | Krishnamurthy | G06F 3/0631 709/213 |
| 2016/0127469 A1 * | 5/2016 | Na | H04L 67/2852 709/216 |

OTHER PUBLICATIONS

International App. No. PCT/US2013/045153; International Preliminary Report on Patentability dated Dec. 24, 2014; 8 pages.
International App. No. PCT/US2013/045153; International Search Report and Written Opinion dated Jan. 29, 2014; 11 pages.

\* cited by examiner

PROVIDING HIGH PERFORMANCE MULTI-TIERED CLOUD STORAGE BASED ON THE PERFORMANCE CRITERIA OF A CUSTOMER

CROSS-REFERENCE TO RELATED APPLICATIONS

This application is a continuation of U.S. patent application Ser. No. 13/915,153, filed Jun. 11, 2013 by Brunk et al. and titled "High Performance Cloud Storage", which claims the benefit, under 35 U.S.C. § 119, of provisional U.S. Patent Application No. 61/658,772, filed Jun. 12, 2012 by Brunk et al. and titled "High Performance Cloud Storage", the entire disclosures of which are incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to data storage solutions and more particularly, to tools and techniques for providing flexible, high-performance storage solutions.

BACKGROUND

Data processing of input/output ("I/O") intensive applications, including enterprise applications such as data warehousing, On-Line Transaction Processing Online Transaction Processing ("OLTP") and Relational Data Base Management Systems ("RDBMS"), are the mainstay of capital intensive in-house Information Technology ("IT") infrastructures. High-performance data storage is a critical component of such applications.

With regard to data storage, the term "performance" means how quickly the storage system can store and/or retrieve data. This measurement is particularly important for I/O intensive applications, because such applications typically perform thousands or millions of I/O operations (writes to storage or reads from storage) per second. Thus, in such contexts, storage performance typically is measured in I/O operations per second ("IOPS").

Unfortunately, data storage technology has not advanced at the same pace as compute technology, creating a performance gap that results in unbalanced systems and constrains overall performance. Typically, IT departments attempt to address this imbalance by adding expensive storage capacity to shrink the I/O performance gap. In traditional storage sub-systems, an increase in I/O performance is achieved by adding disk (i.e. spindles) and writing sparsely across all allocated disks. This results in underutilized capacity to achieve performance.

Cloud service providers currently offer storage solely by subscribed capacity that is shared amongst many tenants, essentially also sharing and reducing performance proportionally. This practice, known as "thin provisioning," renders many cloud storage solutions unsuitable for I/O intensive data processing. As a result, customers are left with only two options—custom-built and maintained high-performance storage solutions, which can be prohibitively expensive, and shared "cloud" storage, which generally cannot provide acceptable performance for I/O intensive applications. For example, current cloud storage offerings, while relatively inexpensive, generally provide performance around 1000-3000 IOPS, which is unacceptable for many applications. Conversely, custom-built storage solutions can provide performance in excess of 1,000,000 IOPS, but such solutions run into the millions of dollars and therefore are prohibitively expensive for many enterprises.

Thus, there is a need for more robust and flexible storage solutions that can provide a balance between capacity, performance, and cost, to allow customers to select an appropriate balance for their specific applications.

BRIEF SUMMARY

A set of embodiments provides high performance data storage solutions, which can include, without limitation, methods, systems, and apparatus. In an aspect, some solutions can be employed in a cloud-computing environment that provides shared storage for a plurality of customers. In other aspects, the data storage solutions provided by some embodiments can provide multiple tiers of storage, each having a different performance level. Thus, certain solutions can provide a customer with the ability (e.g., through a web portal) to design its own custom storage solution that blends multiple tiers of storage at different capacity and performance levels to attain an optimal level of capacity, performance, and cost.

In an aspect, certain embodiments enable such solutions through a novel arrangement of different types of storage devices that are provisioned through a common API. In some cases, the API can access each storage device's native management interface, as well as the host computer for which the storage will be provisioned, to allocate multiple tiers of storage to the host computer in an automated manner. In particular embodiments, this provisioning can be accomplished without any need to reboot the host computer, enabling a relatively seamless provisioning process that provides flexible storage solutions that balance storage performance and cost.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, an exemplary method in accordance with one set of embodiments provides storage within a cloud-computing environment to meet storage performance criteria of a customer. In an aspect, the method might comprise providing, e.g., with a provisioning computer, an application programming interface ("API") for provisioning cloud storage for a host computer; in a particular aspect, the API might be implemented as a web service for receiving configuration information from an administrator, a web portal, and/or the like. The host computer might serve as a container for a plurality of guest computers; in such cases, provisioning storage might comprise provisioning storage for one or more of the guest computers.

The method might further comprise receiving, for example at the provisioning computer and/or via the API, a set of information defining storage needs of the host computer. In some cases, the method further comprises determining, again perhaps with the provisioning computer, a storage type based on the storage needs of the host computer, the storage type including a performance dimension, a capacity dimension, and a cost dimension. In some cases, the API might be able to access a storage model of the cloud storage array.

In accordance with some methods, the provisioning computer might access the host computer using the API. In other cases, the method might comprise the host computer provisioning storage, with the API, from a cloud storage array to allocate a portion of the cloud storage array to the host computer; in an aspect, the portion of the cloud storage array can have the determined storage type. The method might further include storing, with the provisioning computer, a provisioning record indicating the portion of the cloud storage array allocated to the host computer.

In some cases, the cloud storage array might comprise multiple tiers of storage, each tier of storage having a different performance capability. The allocated portion of the cloud storage array, then, might comprise a first sub-portion from a first tier of the cloud storage array and a second sub-portion from a second tier of the cloud storage array. In other cases, the performance dimension might comprise a first performance sub-dimension pertaining to input/output operations per second and a second performance sub-dimension pertaining to latency. Alternatively and/or additionally, the capacity dimension might comprise a plurality of sub-capacity dimensions, each of the sub-capacity dimensions having a corresponding performance sub-dimension and cost sub-dimension.

In accordance with a set of embodiments, the method might further comprise the API governing allocation of the entire cloud storage array among a plurality of host computers, and/or the API preventing over-provisioning of the cloud storage array. In other embodiments, provisioning storage for the host computer might comprise reserving the portion of the cloud storage array for use by the host computer, rather than providing the host computer with shared usage of a storage pool.

In a particular embodiment, the cloud storage array might comprise a plurality of storage devices having different management interfaces, different capacities, and different per-megabyte storage costs. In such cases, provisioning storage from the cloud storage array might comprise provisioning storage from two or more of the storage devices to satisfy the performance dimension, the capacity dimension, and the cost dimension of the determined storage types. In an aspect of one embodiment, the plurality of storage devices might comprise a first storage device manufactured by a first manufacturer and a second storage device manufactured by a second manufacturer. In such cases, the method might include providing a high performance storage fabric between the host computer and the one or more of the storage devices.

Merely by way of example, the first storage device might be a solid state drive ("SSD"), and/or might have a first management interface specific to the first manufacturer. The first storage device might also have an InfiniBand communication interface. The second storage device, on the other hand, might be a spindle-disk subsystem having a second management interface specific to the second manufacturer and/or a Fibre Channel communication interface. The API, then, might comprise a framework that generalizes differing storage management interfaces. Provisioning the storage could comprise communicating, via the API, with the first storage device over the InfiniBand communication interface using the first management interface and/or communicating, via the API, with the second storage device over the Fibre Channel communication interface using the second management interface.

In some embodiments, the set of information defining storage needs of the host computer might comprise a host identifier to identify the host computer, a logical unit number ("LUN") alias to identify provisioned storage, a LUN size indicating a desired size of the provisioned storage, and/or at least one performance criterion for the provisioned storage. Provisioning the storage might comprise creating, with the API, the LUN in the cloud storage array. Provisioning the storage might further comprise assigning, with the API, the LUN to the host computer. This operation can include, without limitation, mapping the LUN to a target port of the cloud storage array and/or masking the LUN to a world wide name ("WWN") for the host computer and/or In other cases, provisioning the storage can include registering, via the API, the LUN with the host computer, such that the host computer can address and use the provisioned storage. In some cases, the storage can be provisioned without rebooting the host computer.

In an aspect of some embodiments, the host computer is registered with the API in order to perform the provisioning process. Hence, the method might include determining, with the provisioning computer, whether the host computer is registered to the API. If it is determined that the host computer is not registered with the API, the method can include registering the host computer with the API. Registering the host computer with the API can comprise a number of operations, including without limitation, defining, in the API, an alias of the host computer, defining, in the API, an Internet protocol ("IP") address of the host computer, and/or defining, in the API, a set of credentials of a management identity on the host computer. Correspondingly, accessing the host computer can comprise accessing, with the API, a registration of the host computer. As noted above, the registration might comprise an alias for the host computer, an IP address of the host computer, and/or a set of credentials of a management identity on the host computer. Accessing the host computer can further include communicating, with the API, with the host computer at the IP address of the host computer and/or authenticating the API at the host computer using the set of credentials.

In some cases, the method includes providing a web portal for a customer to request storage provisioning. Hence, some or all of the set of information about the customer's storage needs might be received via the web portal. Merely by way of example, the web portal might provide a user a user interface for the user to specify the capacity dimension and the performance dimension of the needed storage. The web portal might also provide information to the customer about costs of the desired storage configuration.

Another set of embodiments provides apparatus. An exemplary apparatus, which can be used to provide storage a cloud-computing environment to meet storage performance criteria of a customer, might comprise a non-transitory computer readable medium having encoded thereon a set of instructions executable by a storage provisioning computer to perform one or more operations. As noted above, the set of instructions might be executable to perform operations in accordance with various methods provided by other embodiments.

Hence, the set of instructions might include instructions for providing an API for provisioning cloud storage for a host computer. The set of instructions might further comprise instructions for receiving, via the API, a set of information defining storage needs of the host computer and/or instructions for determining a storage type based on the storage needs of the host computer. In an aspect, the storage type can include a performance dimension, a capacity dimension, and a cost dimension. The set of instructions might feature instructions for accessing the host computer with the API and/or instructions for provisioning storage, with the API, from a cloud storage array to allocate a portion of the cloud storage array to the host computer, the portion of the cloud storage array having the determined storage type. The set of instructions might also include instructions for storing a provisioning record indicating the portion of the cloud storage array allocated to the host computer.

A storage provisioning system in accordance with another set of embodiments might provide storage within a cloud-computing environment to meet storage performance criteria of a customer. Such a system might comprise one or more processors and a non-transitory computer readable medium in communication with the one or more processors. As noted above, the computer readable medium might having encoded thereon a set of instructions executable by the computer system to perform one or more operations, including without limitation instructions executable to perform operations in accordance with various methods. As one example, the set of instructions might comprise the instructions described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
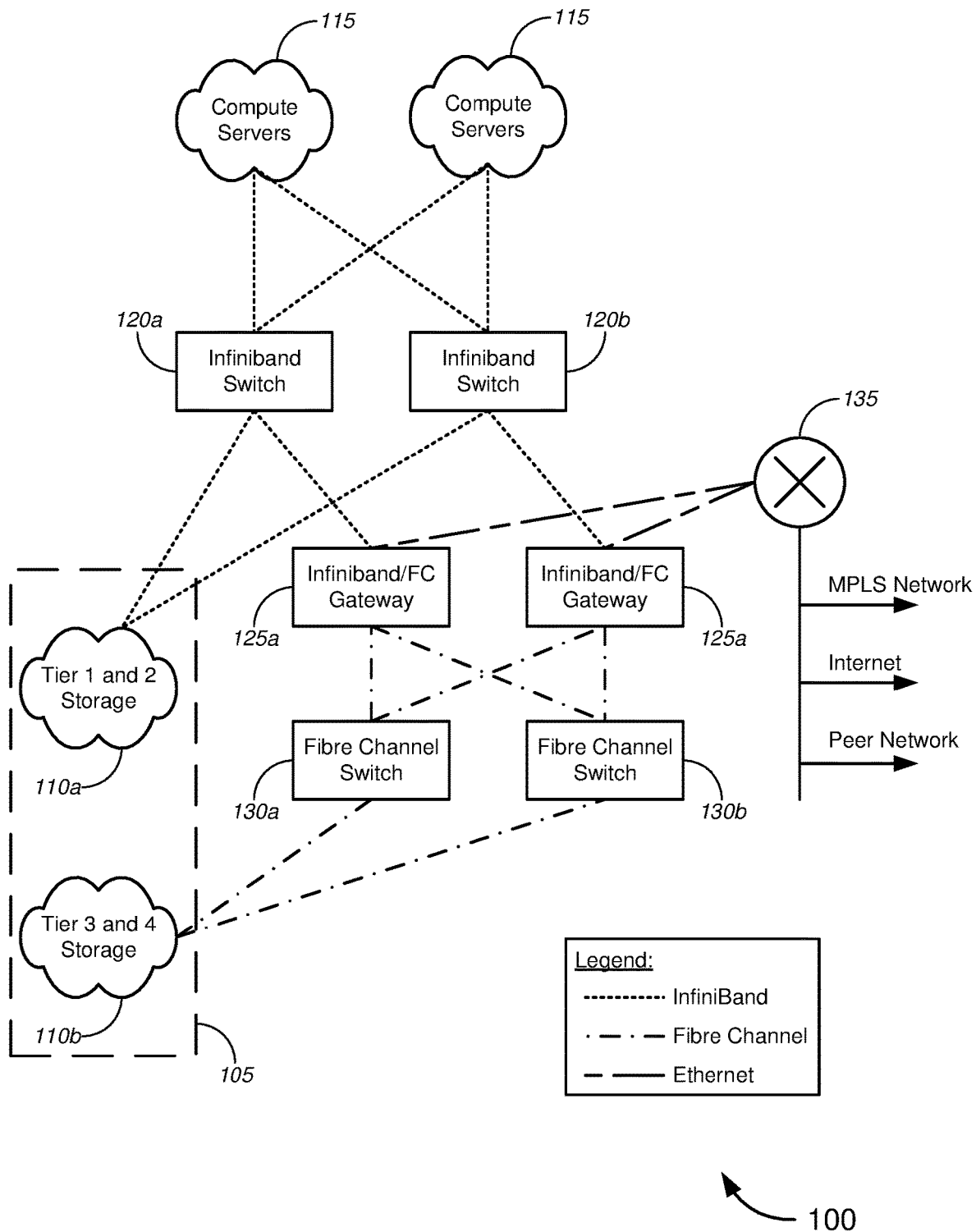
FIG. 1 is a block diagram illustrating a cloud-computing environment that can provide high-performance storage, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Some embodiments provide high performance data storage solutions. In an aspect, some solutions can be employed in a cloud-computing environment that provides shared storage for a plurality of customers. For example the cloud-computing environment might provide shared compute resources (processors, RAM, etc.) for customers to configure virtual machines to perform workload on demand. Certain embodiments, then, can be used to provide customizable, high-performance storage for such virtual machines (which can serve as host computers, in accordance with some embodiments), and/or other host computers within and/or outside the cloud-computing environment.

In other aspects, the data storage solutions provided by some embodiments can provide multiple tiers of storage, each having a different performance level. Merely by way of example, a first tier of storage might provide very high-performance storage, with high-speed interfaces and high-performance drives, at a substantial cost. A second tier of storage might include the same high-speed interfaces but with slightly lower-performance drives, at a slightly lower cost. A third tier might provide performance that is suitable for large capacities but not ideal for real-time transaction processing, at a lower cost still. A fourth tier might provide nearline storage for archival purposes, at an even lower cost. A storage solution can be fashioned from different combinations of capacities from two or more of the tiers. (It should be recognized, of course, that the number of tiers provided, and the characteristics of each tier, can vary by embodiment, and that none of the examples described herein should be considered limiting.) Thus, certain solutions can provide a customer with the ability (e.g., through a web portal) to design its own custom storage solution that blends multiple tiers of storage at different capacity and performance levels to attain an optimal balance of capacity, performance, and cost.

In an aspect, certain embodiments enable such solutions through a novel arrangement of different types of storage devices (which can be grouped into different tiers, according to performance characteristics of each device) that are provisioned through a common API. In some cases, the API can access each storage device's native management interface, as well as the host computer for which the storage will be provisioned, to allocate multiple tiers of storage to the host computer in an automated manner. In particular embodiments, this provisioning can be accomplished without any need to reboot the host computer, enabling a relatively seamless provisioning process that provides flexible storage solutions that balance storage performance and cost.

Solutions provided by certain embodiments offer significant advantages for cloud-computing service providers among others, by being able to provide storage performance that matches the requirements of I/O intensive data processing traditionally only available in capital intensive in-house IT infrastructures. In an aspect, some of the disclosed solutions are based on a multi-tenant, multi-tier architecture that combines traditional storage with advanced high performance storage sub-systems. These sub-systems utilize high-performance interconnects between the compute servers and throughout the storage fabric, minimizing latencies and processing overheads.

In some embodiments, all storage components are provisioned regardless of the underlying storage medium and transport method via an API for compute servers, which might be operating under, inter alia, the CentOS (Linux) operating system. In another aspect, the API is written to function as a standalone Web Service for easy integration with upstream orchestration engines.

Certain embodiments have been proven to provide unforeseen price/performance ratios. Merely by way of example, when benchmarked against industry standards, certain embodiments can outperform similarly priced cloud service offerings by an order of magnitude (or more) and provide similar performance to dedicated in-house solutions at a fraction of the cost. Moreover, unlike in-house solutions, the solutions provided by various embodiments can take advantage of inherent cloud-computing advantages, such as utility computing pricing, elasticity, rapid spin-up, avoidance of technology obsolescence, operational excellence and service level accountability, and operational visibility.

The overall performance of high performance compute infrastructures is determined by the synergetic relationship between three main sub-systems: compute nodes, memory, and storage nodes. Distributed computing systems often consist of several specialized networks such as an Inter-Processor Communication ("IPC") network, Local Area Network ("LAN"), and Storage Area Network ("SAN"). Each network has its own evolutionary trend, administrative strategy, and performance issues. Although different embodiments can employ many configurations, an exemplary cloud storage solution in accordance with certain embodiments comprises a 4-tier storage fabric made up of solid state drive ("SSD") flash storage interconnected via InfiniBand™, combined with traditional SAS and SATA disk spindles interconnected via InfiniBand to Fibre Channel™ gateways.

FIG. 1 illustrates an example of a cloud-computing environment 100 that can be used to provide flexible, high-performance storage, in accordance with one set of embodiments. The cloud-computing environment 100 includes a cloud storage array 105 (a storage fabric) that can comprise multiple tiers 110 of storage. The cloud storage array 105 provides storage for one or more compute servers 115 (which can serve as host computers in accordance with certain embodiments of the invention). As noted above, in aspects of certain embodiments, a compute server 115 can be implemented as a virtual machine within the cloud-computing environment 100. Thus, from a hardware standpoint, the cloud-computing environment might feature a plurality of processors that provide pooled computer resources, a plurality of random access memory ("RAM") devices that provide pooled memory resources, and/or the like, as is known to those skilled in the cloud-computing art. A compute server 115, then, can comprise a dedicated and/or shared allocation of such resources, which employs storage from the club storage array 105.

In a novel aspect, certain embodiments employ specialized a networking configuration, which can provide balance throughput to provide certain tiers of storage with relatively high bandwidth connections, while employing relatively lower bandwidth connections to other tiers, in order to reduce overall costs. For example, in the illustrated embodiment one or more InfiniB and switches 120 provide communication between the compute servers and storage devices in Tiers 1 and 2 110a of the storage array 105. In the illustrated embodiment, the InfiniBand switches 120 are in further communication with one or more InfiniB and/Fibre Channel gateways 125, which in turn provide medication with one or more Fibre Channel switches 130. The Fibre Channel switches 130 provide communication with storage devices in Tiers 3 and 4 110b of the storage array 105. The InfiniBand/Fibre Channel gateways 125 are also in communication with an IP router 135, which can provide connectivity outside the cloud environment 100, e.g., to an MPLS network, a peer network, the Internet, etc.

Advantageously, certain embodiments provide optimal communication paths between the compute servers 115 in different tiers 110 of the storage array 105. Merely by way of example, as illustrated, the compute servers 115 might have high-bandwidth (e.g., approximately 40 Gb/s) InfiniB and connections with the InfiniB and switches 120, which further provide similar InfiniB and connections to Tiers 1 and 2 110a of the storage array 105 and the InfiniB and/Fibre Channel gateways 125. In turn, the gateways 125 might employ somewhat lower bandwidth (e.g., 8 Gb/s) Fibre Channel connections with the Fibre Channel switches 130, which also provide similar Fibre Channel connectivity with Tiers 3 and 4 110b of the storage array 105. The InfiniBand/ Fibre Channel gateways might have a relatively low-bandwidth (e.g., 100 Mb/s-10 Gb/s) Ethernet connection with the IP router 135, as throughput outside the cloud environment is not as critical as throughput between the compute servers 115 and the storage array 105. In this way, the system can provide relatively high throughput and low-latency connections between the compute servers 115 and the Tier 1 and 2 storage 110a, somewhat lower throughput but still relatively low latency communications between the compute servers 115 and the Tier 3 and 4 storage 110b, and relatively low-throughput and somewhat higher latency communications outside the cloud environment 100. This strategy can maximize the utility of the high-performance devices in Tiers 1 and 2 110a while minimizing the overall cost/ performance ratio by employing slower Fibre Channel connections with Tiers 3 and 4 storage 110b.

As a non-limiting example, the storage system of the cloud-computing environment 100 might have a configuration similar to the following: Tier 1 and 2 storage 110a might comprise a plurality of high-performance storage devices, such as SSD devices, commercially available from a variety of vendors. The SSD devices might support communications via high-speed interface, such as Fibre Channel and/or Infiniband. Tier 3 and Tier 4 storage 110b might comprise spindle-based storage devices and/or offline/nearline storage devices, and might feature connectivity using Fibre Channel, SAS, SATA, and/or the like. A variety of different InfiniB and switches, Fibre Channel switches, and Fibre Channel/Infiniband gateways are commercially available, and any appropriate device can be used in accordance with different embodiments.

Figure 2:
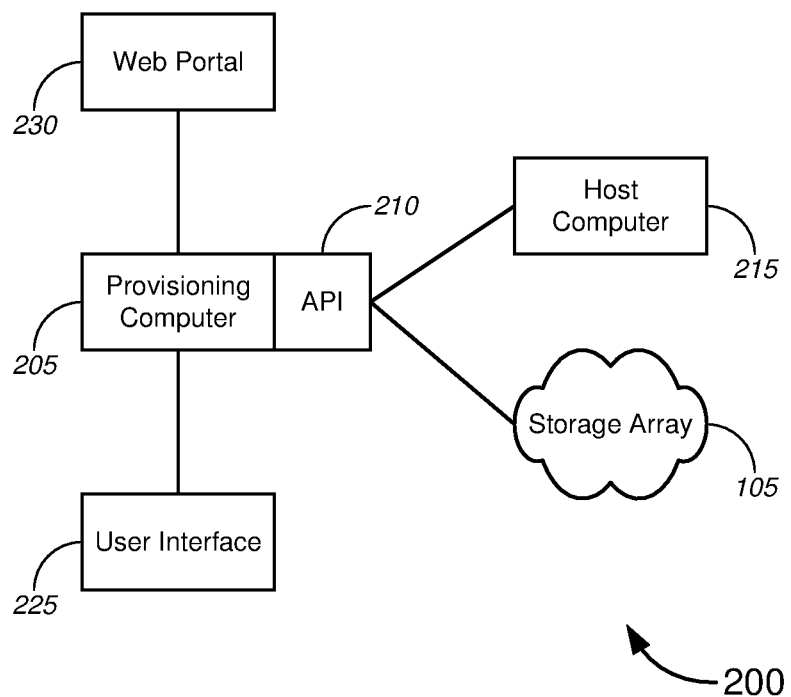
FIG. 2 is a block diagram illustrating a functional relationship between a provisioning computer and other system components, in accordance with various embodiments.

FIG. 2 provides a functional illustration of a system 200 for provisioning storage for a host computer (e.g., using the cloud-computing environment 100 of FIG. 1). The system includes a provisioning computer 205 (which might be one of the compute servers in the cloud environment, but which could also be any other computer with the necessary connectivity to other system devices). The provisioning computer 205 includes an API 210 that communicates with the host computer 215 for which storage is to be provisioned, as well as the storage array 105. In an aspect, the API 210 might communicate using a network such as the network illustrated by FIG. 1. In other aspects, however, the API 210 might communicate with various storage devices out-of-band over a separate management network (not illustrated on FIG. 1).

In different embodiments, the host computer 215 can be any computer for which storage is to be provisioned. Merely by way of example, in some cases, the host computer 215 might be virtual computer embodied by allocated resources in a cloud-computing environment. In other cases, the host computer 215 might be a discrete physical machine. In specific embodiments, the host computer 215 might serve as a container for a plurality of guest computers, each of which might appear to a customer to be a discrete physical computer, with a particular customer having access only to a guest computer, not to the host computer itself. In such embodiments, some of the provisioning tasks discussed below might be performed at the host computer generally, while other provisioning tasks might be performed on individual guest computers within the container. The division of such tasks is implementation-dependent, and for purposes of this disclosure, the performance of provisioning tasks at a guest computer can be considered part of the provisioning at the host computer more generally.

In some aspects, the API 210 receives provisioning information and interacts with the host computer 215 and/or the storage array 105 (e.g., as described in detail below) to perform the provisioning of the necessary storage for the host computer 215 automatically (i.e., without the need for direct user interaction); in some cases, the API can perform all necessary configuration of the host computer 215 to provision the necessary storage without requiring reboot of the host computer 215, thereby reducing downtime and enhancing efficiency.

In some embodiments, the API 210 is implemented as a web service that accepts requests (e.g., from the user-interface 225, from the web portal 230, from another computer, etc.) and interacts with the storage array 105 and/or one or more host computers 215 to perform provisioning and/or other administrative tasks with regard to the storage array 105.

Merely by way of example, in accordance with some embodiments, the API 210 can perform, inter alia, four core functions: environment discovery, high-level provisioning, intermediate level provisioning, and accessing the storage model of the storage array 105. Environment discovery can include, without limitation, discovering connectivity between devices in the cloud-computing environment 100, discovering existing logical unit numbers ("LUN"), discovering the existing configuration of the host computer, and/or discovering LUN assignments. High-level provisioning tasks can include, without limitation, single calls for provisioning and/or un-provisioning storage. Intermediate level provisioning tasks can include individual calls for performing component steps of the project provisioning process, examples of which are described in further detail below. Accessing the storage model can include, without limitation, developing a list of known host computers, a list of storage types available, assessing switch performance, adding a storage device to the storage array 105, and/or the like.

In a novel aspect, the API 210 functions to generalize specific management interfaces of various host computers 215 and storage devices within the storage array 105. Thus, the API 210 can accept provisioning and/or administrative requests in a common format, and can access storage devices using the native management interfaces provided by the manufacturer of each device, thereby allowing automated provisioning and/or administration of those devices from a central provisioning computer 205. Likewise, the API 210 can access a host computer 215 with administrator rights, allowing automated configuration of the host computer 215 without requiring direct user interaction.

In an exemplary embodiment, the API supports the following functions:

High Level Provisioning Functions

These functions can be used to provision or unprovision storage with a single, simple call to the function.

a) provisionStorage—high-level provisioning function. When called with the host ID, LUN alias, LUN size in megabytes, and storage type id, this method creates and assigns the Logical Unit Number (LUN) in the storage array and registers the LUN on the on the host computer operating system. Any failure along the way will be reported.

b) unprovisionStorage—high-level unprovisioning function. When called with the host ID and LUN ID, will unregister the LUN on the host operating system and will completely remove the LUN from the storage array.

Discovery Functions

These functions can be used to build (or rebuild) the API's database by discovering information from the various devices.

a) discoverLUNs: Given a storage device id, discovers all of the currently created LUNs on the array with properties as available for the specific array. This would need to be used if an array had LUNs created on it prior to being added to the provisioning API if LUNs were manually added or removed via the arrays interface, or if the provision call failed after the LUN was created.

b) discoverTargets: Given a storage device id, discovers all of the target GUIDs (InfinBand) or WWNs (Fiber Channel) for the array.

c) discoverInitiators: Given a host id, discovers all of the initiators in the host.

d) discoverAssignments: Given a storage device id, discovers all the current assignments to hosts.

e) discoverConnectivityFromHost: Given a host id, discovers the InfinBand switches that the host is connected to along with all the visible targets.

f) discoverConnectivityDevice: Given a switch id, discovers the Fibre Channel connectivity, InfinBand connectivity, and/or gateway connectivity.

Intermediate-Level Provisioning Functions

Intermediate functions allow a finer grain control over the provisioning process without going to the individual device level. To mirror the provision storage call, one could call discoverInitiators, discoverConnectivityFromHost, createStorage, assignStorage, and registerStorage. To mirror the un-provision storage call, one could call unregisterStorage, unassignStorage, and removeStorage.

a) createStorage: Given a LUN alias, a size in megabytes, and a storage type id, automatically selects the proper array and creates a LUN with the proper characteristics.

b) assignStorage: Given a host ID and LUN ID, performs the necessary mapping, masking, and/or assigning steps for the host to have access to the LUN. The host does not have to be up, but the initiators and targets must have been discovered previously in their current configuration.

c) registerStorage: Given a host ID and LUN ID, performs the steps necessary to create a block device on the host for the specified LUN. This step can implement secure shell ("SSH") access to the host to execute the appropriate commands.

d) unregisterStorage: Given a host ID and LUN ID, performs the steps necessary to remove the block device from the host for the specified Logical Unit Number (LUN). This step can employ SSH access to the host to execute the appropriate commands.

e) unassignStorage: Given a host ID and LUN ID, un-assigns, un-maps, and/or unmasks the LUN from being visible by the host.

f) removeStorage: Given a LUN id, removes the LUN from the array.

g) resizeStorage: Given a LUN id and a new size in megabytes, extends the size of the LUN to that size. You are only allowed to increase the size of the Logical Unit Number.

Model Related Functions

Model related functions allow the inspection or editing of the storage configuration data stored in the API as an alternative to going directly to the database.

a) getHost: Given a host id, attempts to contact the host and collect general properties about the host.

b) addHost: Given the properties of host alias, host type id, management address, and management identity id, creates a record of the host in the provisioning API.

c) getLUNIDsOnStorageDevice: Given a storage device id, returns a list of the LUN IDs on that storage array.

d) getStorageDevice: Given a storage device ID, contacts the array, retrieves a set of known properties and returns them.

e) getStorageDeviceIds: Returns a list of storage devices id's currently known to the API f) getHostIds: Returns a list of host id's currently known to the provisioning API.

g) setManagementIdentityPassword: Given a management identity ID and a password, updates the password of that management identity.

h) getStorageTypeIds: Returns a list of the storage type IDs currently available in the API.

i) getStorageType: Given a storage type ID, returns a storage type object. Each storage type can represent each storage tier and configuration options.

j) addManagementIdentity: Creates a management identity given the parameters of an alias, identity file (path), user name, and password.

k) addStorageDevice: Given the parameters of alias, serial number, storage device type id, tags, management identity id, and management address, creates a record of the array in the API.

l) getStorageDevicePerformance: Given a storage device ID, returns storage metrics. For some devices, this returns metrics by port and slot. For other devices, it may require configuration of a Tuning manager and return metrics by port.

m) getConnectivityDevicePerformance: Given a connectivity device ID, returns the port metrics.

The provisioning computer 205 can also include a user interface 225 for interacting with a user, such as an administrator, who provides input (e.g., a set of information about storage needs for the host computer 215) that is used to configure the provisioning storage for the host computer 215. In some cases, the provisioning computer 205 also includes a web portal 230 (which might be provided by the provisioning computer 205 itself, and/or might be provided by a separate web server—not shown on FIG. 2—in communication with the provisioning computer 205). In some cases, the web portal 230 might provide the user interface 225, and/or portion thereof. Merely by way of example, the web portal 230 might provide a customer interface, e.g., as described in further detail below, for customer to order new storage provisioning on a self-service basis. In such a case, the customer might provide at least some of the information via the Web portal 230 that is used to determine the type of storage that needs to be provisioned.

The user interface 225 allows users to interact with the provisioning computer 205. A variety of user interfaces may be provided in accordance with various embodiments, including without limitation graphical user interfaces that display, for a user, display screens for providing information to the user and/or receiving user input from a user.

Merely by way of example, in some embodiments, the provisioning computer 205 may be configured to communicate with a client computer via a dedicated application running on the client computer; in this situation, the user interface 225 might be displayed by the client computer (e.g., to allow interaction with the API 210), based on data and/or instructions provided by the provisioning computer. In this situation, providing the user interface might comprise providing instructions and/or data to cause the client computer to display the user interface. In other embodiments, the user interface may be provided from a web site, e.g., by providing a set of one or more web pages, which might be displayed in a web browser running on a user computer and/or might be served by a web server. In various embodiments, the provisioning computer 205 might comprise the web server and/or be in communication with the web server, such that the provisioning computer 205 provides data to the web server to be incorporated in web pages served by the web server for reception and/or display by a browser at the user computer. As noted above, the web portal 230 can, in some embodiments, be considered a special case of the user interface 225, in that it can provide an interface for a customer to the provisioning computer 205, so that the customer can configure storage on a self-service basis.

Figure 3:
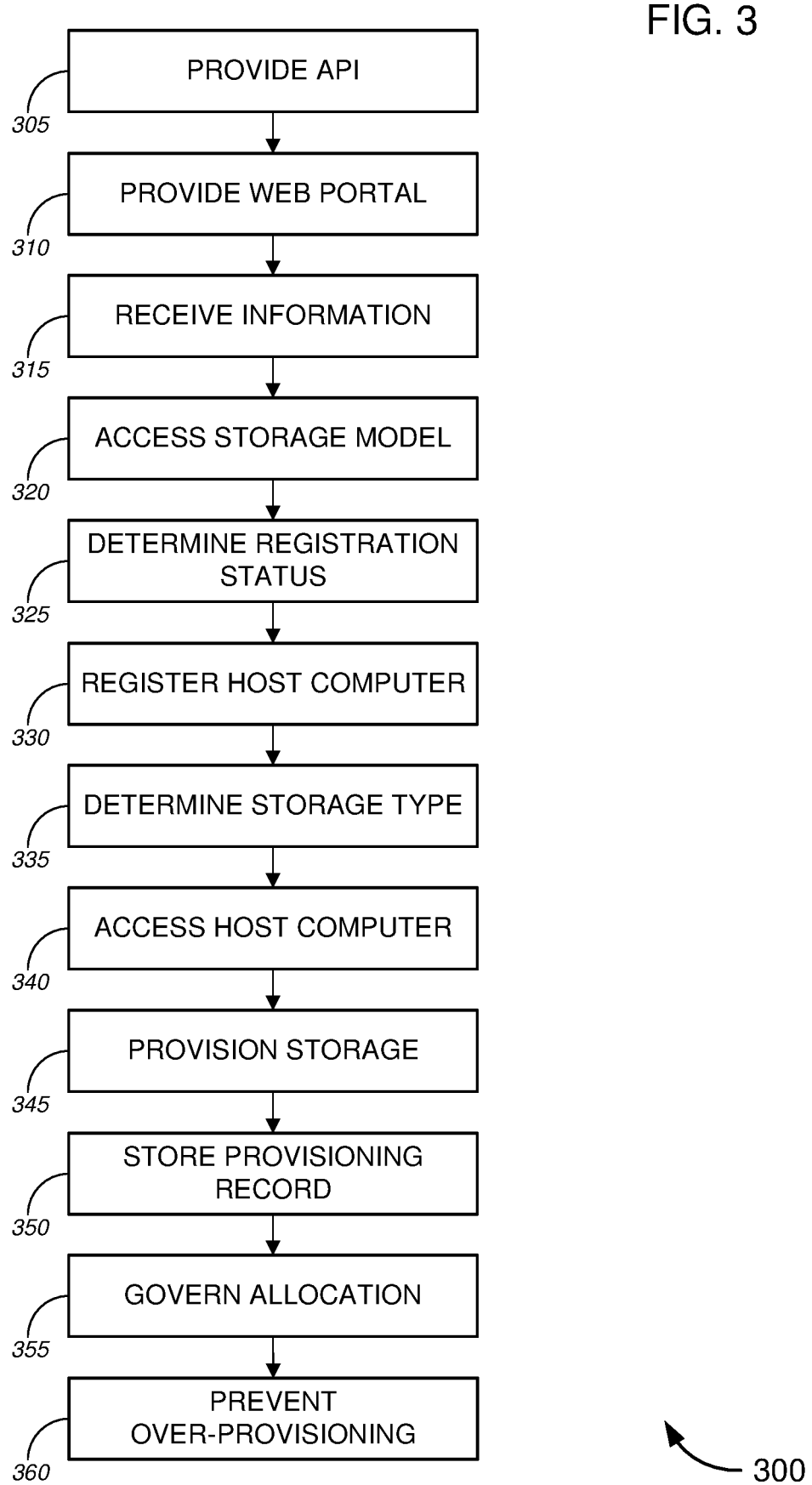
FIG. 3 is a process flow diagram illustrating a method of providing storage, in accordance with various embodiments.
Figure 4:
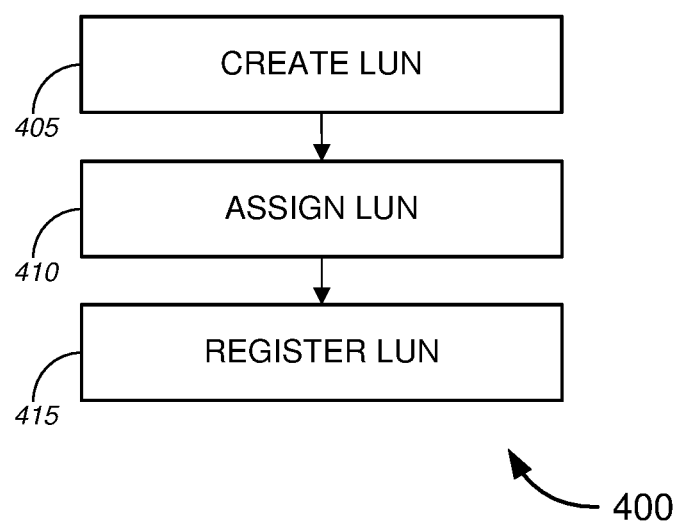
FIG. 4 is a process flow diagram illustrating a method of provisioning storage for a host computer, in accordance with various embodiments.

FIGS. 3 and 4 illustrate various methods that can be used to provide storage for a host computer, in accordance with various embodiments. While the methods of FIGS. 3 and 4 are illustrated, for ease of description, as different methods, it should be appreciated that the various techniques and procedures of these methods can be combined in any suitable fashion, and that, in some embodiments, the methods depicted by FIGS. 3 and 4 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 3 and 4 can be implemented by (and, in some cases, are described below with respect to) cloud-computing environment of FIG. 1 and/or the provisioning system 200 of FIG. 2 (or components thereof, including in particular, the provisioning computer 205), these methods may also be implemented using any suitable hardware implementation. Similarly, while the cloud-computing environment 100 of FIG. 1 and the provisioning system 200 of FIG. 2 (and/or components thereof) can operate according to the methods illustrated by FIGS. 3 and 4 (e.g., by executing instructions embodied on a computer readable medium), the systems 100 and 200 can also operate according to other modes of operation and/or perform other suitable procedures.

FIG. 3 illustrates a method 300 of providing storage for a host computer, which, as noted above, might be a virtual machine in a cloud environment, or might be any other computer that needs access to flexible, high-performance storage. The method 300 includes providing an API, such as the API described above, for provisioning cloud storage for a host computer (block 305).

At block 310, the method comprises providing a user interface for providing interaction between a user and the provisioning computer. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens, each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input, the user interface may be the vehicle for the exchange of such input/output. Merely by way of example, in a set of embodiments, the user interface can allow a user to provide configuration information for a provisioning operation.

Figure 5:
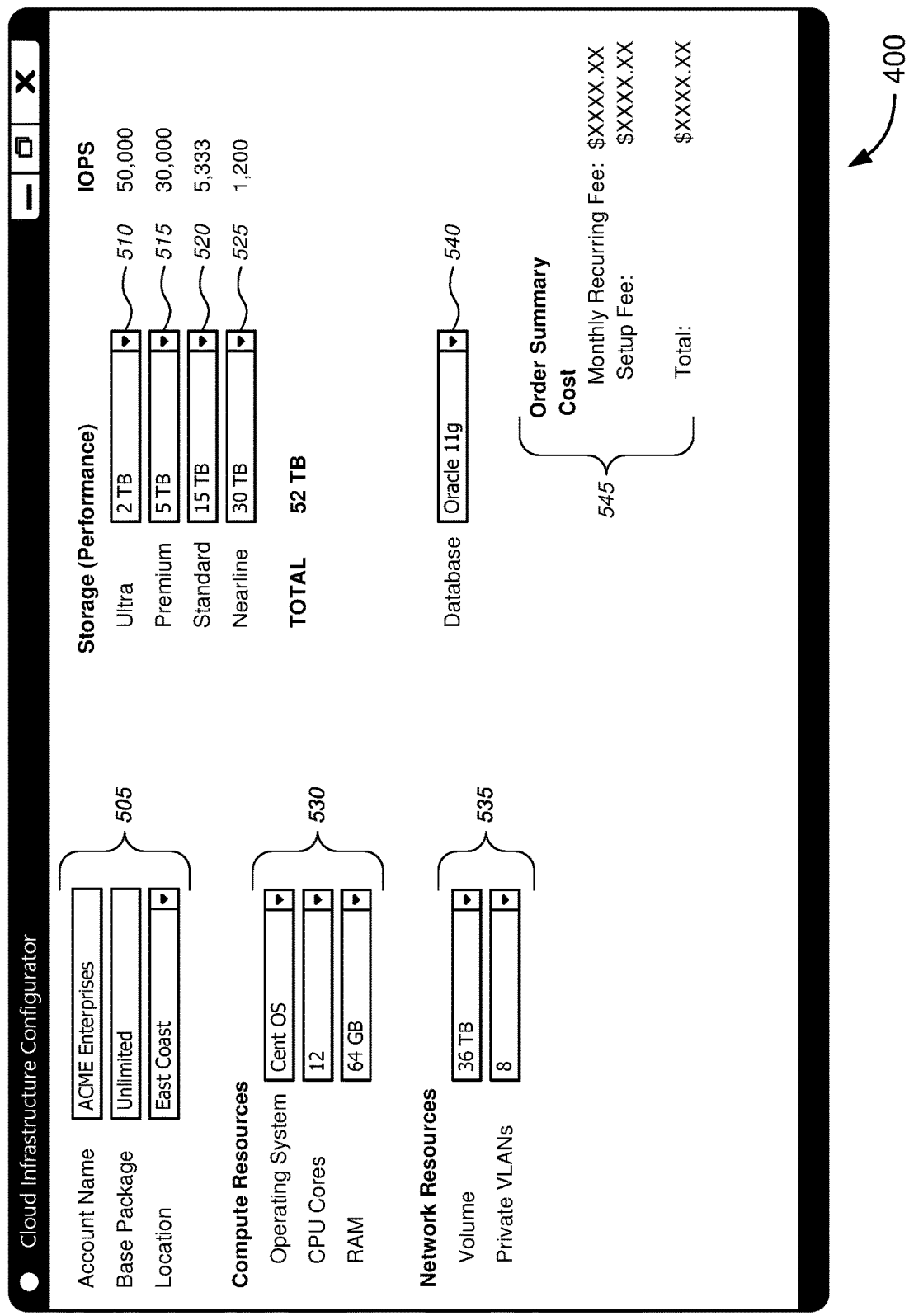
FIG. 5 is an exemplary screen display illustrating a user interface for a customer to request storage for a host computer, in accordance with various embodiments.

As noted above, in some cases the user interface can include a web portal, which can allow a customer to request storage provisioning. In such cases, at least some of the configuration information for provisioning the storage can be received via the web portal. FIG. 5, discussed in further detail below, provides an example of a user interface, which can be provided by a web portal or otherwise.

At block 315, the method 300 comprises receiving a set of information (e.g., configuration information) defining storage needs of the host computer. In some cases, this information can be received with the provisioning computer and/or via the API. For instance, as noted above, the provisioning computer might provide a user interface and/or a web portal. A user might provide user input using the user interface/web portal, and this user input might provide some or all of the configuration information needed to provision the storage. In other cases, another application might call the API (e.g., using functions described above) using configuration information provided by a user and/or otherwise obtained by that application. Thus, there are a variety of ways in which the API can receive information to be used for provisioning storage.

Configuration information can include any and/or all information necessary for the provisioning computer to provision the storage needed by the host computer. Such configuration information can include information from which a storage type can be determined. Additionally and/or alternatively, configuration information can include information a host identifier to identify the host computer to the API, a LUN alias to identify the provisioned storage, a LUN size indicating a desired size of the provisioned storage, and/or at least one performance criterion (e.g., a throughput criterion, a latency criterion, etc.) for the provisioned storage. In embodiments where different Tiers of storage are to be provisioned, this information might be provided for each tier of storage to be provisioned. In some cases, customer-supplied information (such as the desired capacity and performance of the storage) might be combined with automatically generated (or administrator-supplied) information, such as LUN alias (identifier) by which the storage should be identified, to create the set of configuration information.

As noted above, in some embodiments, the API is configured to access a storage model of the cloud-computing environment (block 320), e.g., using functions similar to those described above. By accessing the storage model, the provisioning computer can define and/or identify the host computer, determine which storage resources are available for allocation and/or meet the specified storage needs, configure additional storage devices as necessary or appropriate, etc.

For example, at block 325, the method 300 comprises determining a registration status of the host computer. Generally, a host computer will be registered with the API the first time storage is provisioned for the host computer, or optionally, when the host computer itself is provisioned (e.g., in some cases when the host computer is a virtual machine in the cloud-computing environment). The API might access the storage model and search for the provided host alias (or IP address, etc.) to determine whether the host computer is registered with the API. (Alternatively and/or additionally, the API might maintain its own registration records separate from the storage model.) If the host computer is not registered with the API, the method 300 might include registering the host computer with the API (block 330). Registering the host computer with the API might comprise defining, in the API, an alias of the host computer (which can be used to identify the host computer going forward. Registering the host computer might further comprise defining, in the API, an IP address of the host computer (which can be used later in the process to access the host computer). In some cases, registering the host computer can comprise defining, in the API, a set of credentials (e.g., a username/password combination, an identity certificate or token, etc.) of a management (e.g., administrator) identity on the host computer; these credentials (the nature of which often will depend on the operating system of the host computer) can be used by the API to log into the host computer to perform provisioning tasks, as described in further detail below.

In some cases, the method 300 can include determining a storage type for the storage to be provisioned (block 335). In an aspect, the determined storage type is based on the storage needs of the computer. In another aspect, the storage type can include several dimensions, including without limitation, a capacity dimension, a performance dimension, and/or a cost dimension. For example, the storage type might specify that the host computer needs 10 TB of Tier 1 storage, based on configuration information indicating that the customer would like to provision at least 10 TB of storage at a performance level of at least 30,000 IOPS. The cost dimension can be assigned by the provider, and generally will be dependent on the capacity/performance combination selected by the customer. In some cases, the storage type might include multiple capacity sub-dimensions, such as when the customer would like X TB of storage at A performance level and Y TB of storage at B performance level, which might correspond to X TB of Tier 1 storage and Y TB of Tier 2 storage, etc. In such cases, each capacity sub-dimension might also have an associated performance sub-dimension and cost sub-dimension. In such cases, each combination of a related capacity sub-dimension, performance sub-dimension and cost sub-dimension might be treated by the method 300 as a separate storage type and/or might be provisioned separately using the procedures described herein. In other embodiments, the performance dimension might have sub-dimensions of its own, such as a throughput (IOPS) sub-dimension and a latency sub-dimension, which can be specified separately and might result in a different determination of storage type (tier) for the provisioned storage than if performance were considered unidimensionally (e.g., only as a function of IOPS).

Thus, the storage array might comprise a plurality of different storage devices, each of which has its own management interface, capacity, performance capabilities, and storage costs (e.g., per-megabyte). The storage type might be determined to include storage from two or more of these different devices to satisfy the customer's preferences with regard to the performance dimension, capacity dimension and cost dimension. (As noted above, this might be considered multiple storage types to be provisioned by the customer.) Merely by way of example, the customer's needs might require provisioning storage from a first storage device manufactured by a first manufacturer and provisioning storage from a second storage device manufactured by a second manufacturer. In an exemplary case, the first storage device being a solid-state drive ("SSD") that provides Tier 1 storage; the first storage device might have a first management interface specific to the first manufacturer and/or an InfiniB and communication interface. The cloud storage array might comprise a high performance storage fabric. The second storage device might be a spindle-disk subsystem that provides Tier 3 storage and has a second management interface specific to the second manufacturer and a Fibre Channel communication interface.

At block 340, the method 300 comprises accessing the host computer. In some embodiments, the provisioning computer uses the API to access the host computer, using information about the host computer during registration of the host computer with the API. For example, the API might access the registration of the host computer using an alias provided with the configuration information. From the registration, the API can identify an IP address of the host computer and a set of credentials of a management identity on the host computer. The API then can communicate with the host computer at the identified IP address and authenticate with the host computer using the set of credentials. Once the API has accessed the host computer, it has the ability to perform any tasks on the host computer necessary to provision the storage for the host computer.

Thus, at block 345, the method 300 comprises provisioning storage. In an aspect, the storage is provisioned from a cloud storage array (e.g., a storage fabric) to allocate a portion of the cloud storage array to the host computer. In an aspect, the provisioned storage might have the storage type(s) determined to be appropriate for the host computer.

A number of techniques can be used by the API to provision storage for the host computer. Merely by way of example FIG. 4 illustrates a method 400 that can be used by the API to provision the storage for a particular device. If the provisioned storage includes storage on a plurality of storage devices within the array (e.g., a Tier 1 device, a Tier 2 device, and a Tier 3 device), the method 400 can be repeated for each device on which storage is to be provisioned.

At block 405, the API creates a LUN in the cloud storage array (e.g., based on the LUN provided with the configuration information). Typically, the LUN creation process is performed using the native management interface(s) of the devices on which the LUN is to be created. As noted above, the API is configured to access each storage device using that native management interface and create the LUN using the techniques provided by the native management interface. At block 410, then, the API assigns the LUN to the host computer on the storage device, again using the native management interface of the storage device. Merely by way of example, the API might map the LUN to a target port of the storage array (or the specific device) and mask the LUN to a WWN that the host computer can use to access the LUN.

At block 415, the API registers the LUN with the host computer itself. As noted previously, the API can access the host computer with administrative privileges, and after obtaining such access, the API is configured to perform the necessary operations (which depend on the operating system of the host computer, which, in some cases, can be identified from information stored in the host computer's registration with the API) to register the newly-created LUN with the operating system of the host computer, so that the host computer can access the provisioned storage.

Returning to FIG. 3, the method 300 might further comprise storing a provisioning record indicating the portion of the cloud storage array allocated to the host computer (block 350). In this way, the API can track the storage provisioned for each host computer that has storage provisioned by the API. In some cases, the API is used to govern allocation of the entire storage array (block 355) among multiple host computers. In other words, no provisioning tools other than the API are used to provision storage from the cloud storage array. (If other tools have been used in the past, the previously provisioned storage can be registered with the API using the environment discovery functions described above.) In this way, the API can prevent over-provisioning of the cloud storage array (block 360). By preventing over-provisioning of the storage array, the API can ensure that the performance of any particular provisioned storage does not fall below threshold levels, ensuring the performance that the customer ordered.

As noted above, some embodiments provide a web portal for a customer to provision storage on a self-service basis. FIG. 5 illustrates an example of a screen display providing a user interface 500 for a customer to perform such provisioning. (The user interface 500 can be provided by the web portal and/or by any other technique, such as those described above, for example.)

The exemplary user interface 500 includes user interface widgets 505 for the user to provide user input specifying demographic details of the user (such as the customer account name, the cloud-computing package selected, and the general geographic area desired for the cloud resources). The user interface also includes widgets 510-525 for the user to specify the customer's storage needs. For example, a first widget 510 provides the user with the ability to select a capacity of Tier 1 storage (which, in this example, can provide 50,000 IOPS) to be provisioned, while a second widget 515 provides the user with the ability to select the capacity of Tier 2 storage (which, in this example, can provide 30,000 IOPS) to be provisioned. Similarly a third widget 520 provides the user with the ability to select a capacity of Tier 3 storage (5333 IOPS, in this example) to be provisioned, and a fourth widget 525 provides the user with the ability to select an amount of Tier 4 storage (1200 IOPS, in this example) to be provisioned. The user interface 500 then might display for the user the total amount of storage that has been requested.

The exemplary user interface 500 might include other options as well. For example, as illustrated, a set of widgets 530 below the user to specify the nature of compute resources that should be provided for the user's virtual machine in the cloud-computing environment (these compute resources might function as the host computer for which the storage is to be provisioned), while another set of widgets 535 can be used to specify the amount of network bandwidth (e.g. between the user's virtual machine and the Internet) and/or a widget 540 to specify any applications, such as RDBMS applications, enterprise applications, data warehousing applications, transaction processing applications, etc. that should be provision on the virtual machine.

In some cases, the user interface will provide an order summary 545, which details the costs (which might include one-time costs and/or recurring fees) for the virtual machine (and/or storage provisioning) as configured by the user. Although not shown on FIG. 5, the user interface might further feature a widget, such as a "submit" button, that allows the customer to place the order. Upon placement of the order, the input provided by the customer can be used as configuration information by a provisioning computer, for example as described in detail above.

Figure 6:
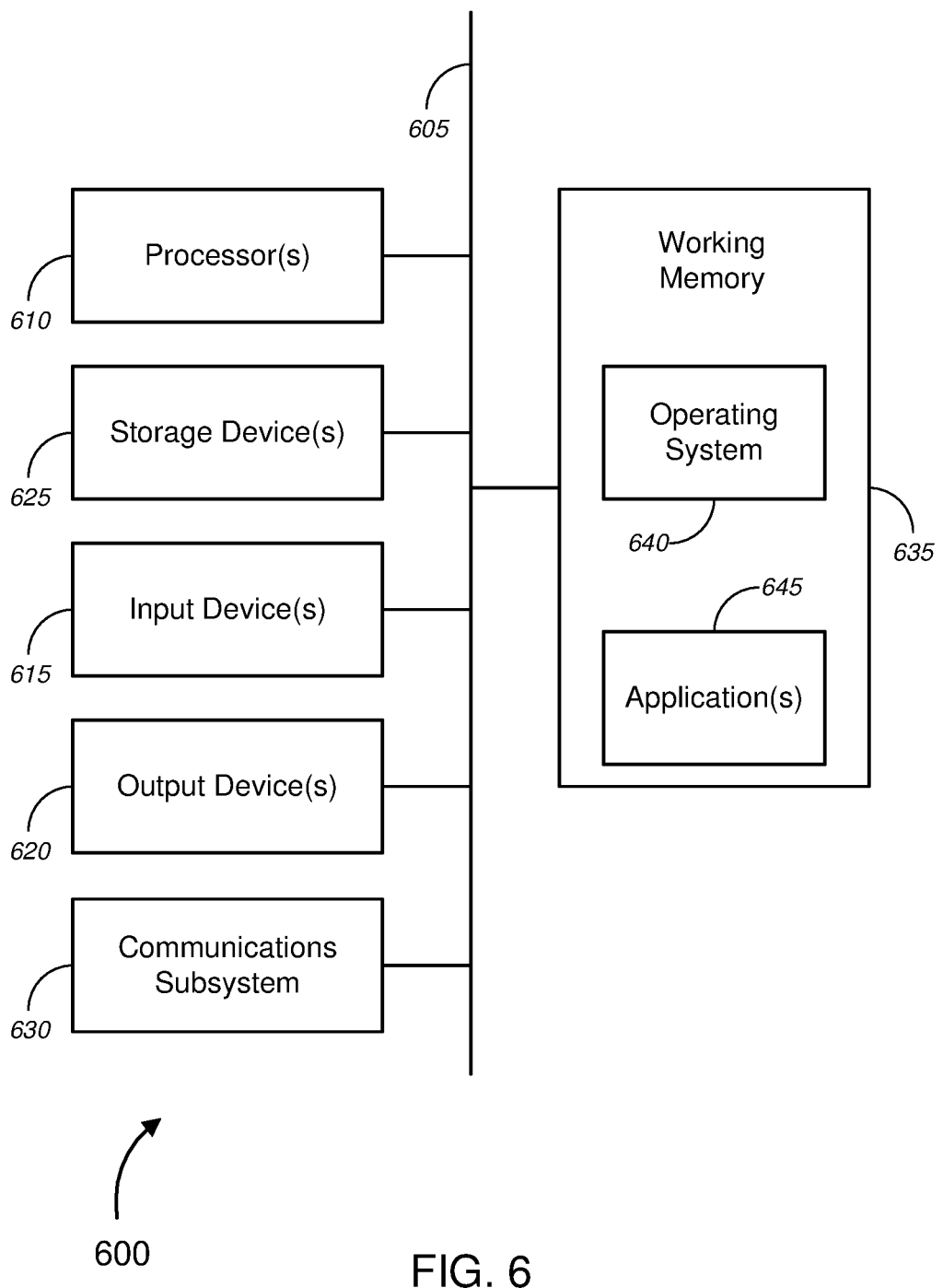
FIG. 6 is a generalized schematic diagram illustrating a computer system, in accordance with various embodiments.

FIG. 6 provides a schematic illustration of one embodiment of a computer system 600 that can perform the methods provided by various other embodiments, as described herein, and/or can function as client computer, provisioning computer, host computer, and/or the like. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner. (It should be further recognized that FIG. 6 illustrates an architecture for a stand-alone computer, and that a virtual computer might virtualize some or all of the resources illustrated on FIG. 6 from a pool of shared resources in a cloud-computing environment. By the same token, either a stand-alone computer or a virtual machine might lack some of the components illustrated by FIG. 6, and FIG. 6 therefore should not be considered limiting in any respect.)

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless, wired, or virtual, including without limitation a physical or virtual InfiniBand host adapter, Fibre Channel host adapter, Ethernet host adapter, etc.), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with the cloud storage array, with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infra-red data communications).

Common forms of non-transitory, physical and/or tangible computer readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, and/or or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
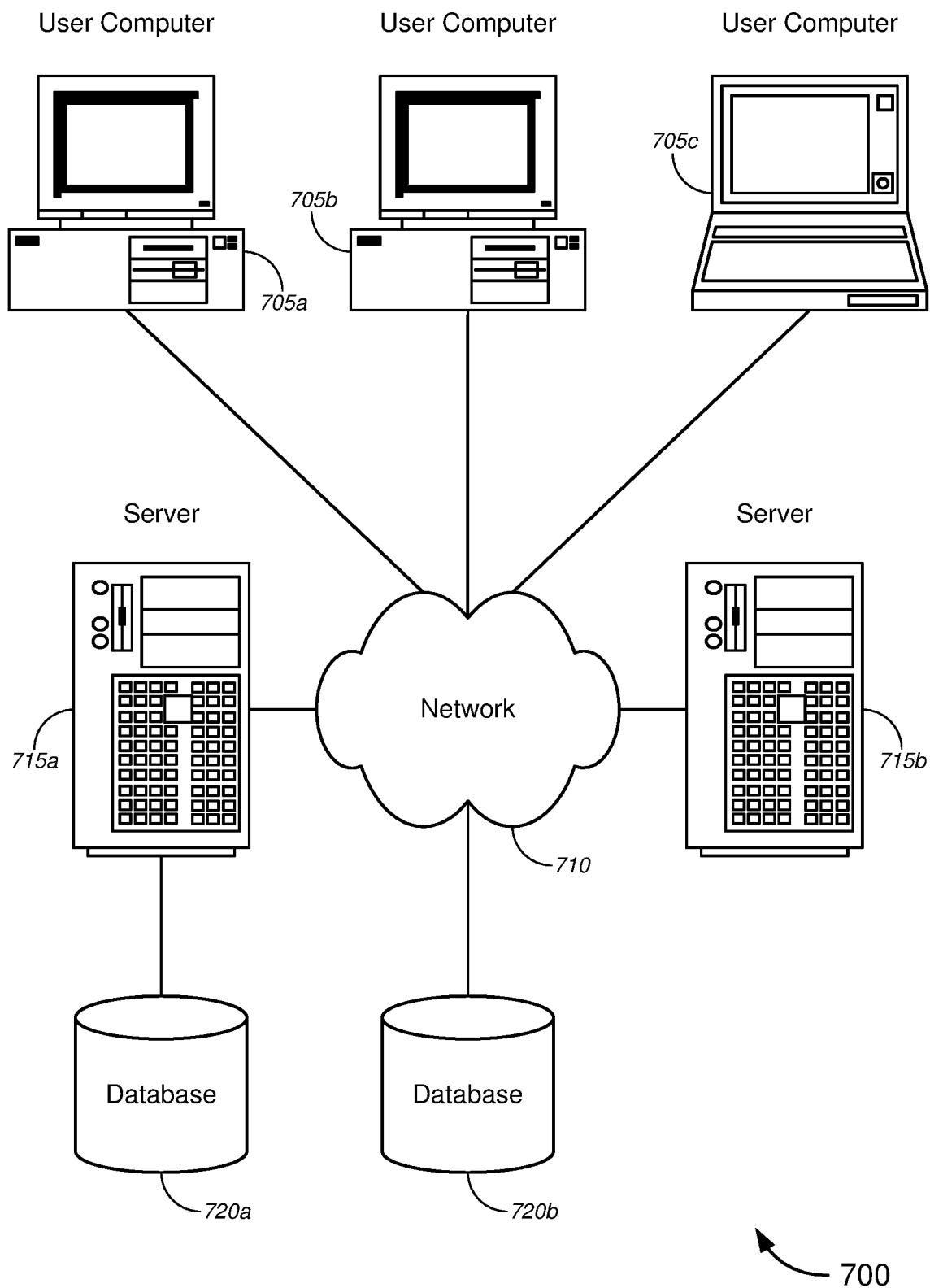
FIG. 7 is a block diagram illustrating a networked system of computers, which can be used in accordance with various embodiments.

As noted above, a set of embodiments comprises systems for providing flexible, high-speed storage for a host computer. FIG. 7 illustrates a schematic diagram of a system 700 that can be used in accordance with one set of embodiments. The system 700 can include one or more user computers 705 (also referred to as client computers). A user computer 705 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. In some cases, a user computer can be a virtual machine within a cloud-computing environment. A user computer 705 can also have any of a variety of applications, including one or more applications configured to perform methods provided by various embodiments (as described above, for example), as well as one or more office applications, database client and/or server applications, and/or web browser applications. Alternatively, a user computer 705 can be any other electronic device, such as a thin-client computer, Internet-enabled mobile telephone, and/or personal digital assistant, capable of communicating via a network (e.g., the network 710 described below) and/or of displaying and navigating web pages or other types of electronic documents. Although the exemplary system 700 is shown with three user computers 705, any number of user computers can be supported.

Certain embodiments operate in a networked environment, which can include a network 710. In a particular case, the network can include Ethernet, InfiniB and/or Fibre Channel communications similar to those illustrated by FIG. 1 above and can provide communications within a cloud-computing environment and/or between the cloud-computing environment and other devices. More generally, the network 710 can be any type of network familiar to those skilled in the art that can support data communications using any of a variety of commercially-available (and/or free or proprietary) protocols, including without limitation TCP/IP and the like. Merely by way of example, the network 710 can include the network described above with respect to FIG. 1, and/or can include a local area network ("LAN"), including without limitation a fiber network, an Ethernet network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 715, each of which can be (but need not necessarily be) virtual machines within a cloud-computing environment. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a web server, which can be used, merely by way of example, to process requests for web pages or other electronic documents from user computers 705, such as by providing a web portal similar to that described above. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention. Another server 715 might serve as a provisioning computer, as described above.

One or more of the servers 715 can be a host computer for which storage is to be provisioned. The server computers 715, in some embodiments, might include one or more application servers, which can be configured with one or more applications accessible by a client running on one or more of the client computers 705 and/or other servers 715. Merely by way of example, the server(s) 715 can be one or more general purpose computers (including without limitation virtual machines within the cloud-computing environment) capable of executing programs or scripts in response to the user computers 705 and/or other servers 715, including without limitation web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 705 and/or another server 715. In some embodiments, an application server can create web pages dynamically for displaying the information in accordance with various embodiments, such as for providing an interface to an enterprise application, providing a web portal as described above, etc. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720, including without limitation an API database as described above, a database managed by an RDBMS on a host computer, etc. The location of the database(s) 720 is discretionary: merely by way of example, a database 720*a* might reside on a storage medium local to (and/or resident in) a server 715*a* (and/or a user computer 705). Alternatively, a database 720*b* can be remote from any or all of the computers 705, 715, so long as it can be in communication (e.g., via the network 710) with one or more of these. In a particular set of embodiments, a database 720 can reside on provisioned storage in a cloud storage array. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing storage within a cloud-computing environment to meet storage performance criteria of a customer, the method comprising:
   providing, with a provisioning computer, an application programming interface ("API") for provisioning cloud storage for a host computer;
   receiving, with the provisioning computer and via the API, a set of information defining storage needs of the host computer;
   determining, with the provisioning computer, a storage type based on the storage needs of the host computer, the storage type including a performance dimension, a capacity dimension, and a cost dimension;
   accessing the host computer with the provisioning computer using the API; and
   provisioning storage, with the API, from a cloud storage array to allocate a portion of the cloud storage array to the host computer, the portion of the cloud storage array having the determined storage type, wherein the cloud storage array comprises multiple tiers of storage, each tier of storage having a different performance capability, wherein the allocated portion of the cloud storage array comprises at least a first sub-portion from a first tier of the cloud storage array and a second sub-portion from a second tier of the cloud storage array;
   wherein at least one of the first sub-portion from the first tier of the cloud storage array or the second sub-portion from the second tier of the cloud storage array had not previously been provisioned to the host computer, and the at least one of the first sub-portion or the second sub-portion is newly provisioned to the host computer without rebooting the host computer.

2. The method of claim 1, further comprising:
   the API governing allocation of the entire cloud storage array among a plurality of host computers; and
   the API preventing over-provisioning of the cloud storage array.

3. The method of claim 1, wherein provisioning storage comprises reserving the portion of the cloud storage array for use by the host computer, instead of providing the host computer with shared usage of a storage pool.

4. The method of claim 1, wherein the performance dimension comprises a first performance sub-dimension pertaining to input/output operations per second and a second performance sub-dimension pertaining to latency.

5. The method of claim 1, wherein the capacity dimension comprises a plurality of capacity sub-dimensions, each of the capacity sub-dimensions having a corresponding performance sub-dimension and cost sub-dimension.

6. The method of claim 1, wherein the cloud storage array comprises a plurality of storage devices having different management interfaces, different capacities, and different per-megabyte storage costs.

7. The method of claim 6, wherein provisioning storage from the cloud storage array comprises provisioning storage from two or more of the storage devices to satisfy the performance dimension, the capacity dimension, and the cost dimension of the determined storage types.

8. The method of claim 6, wherein the plurality of storage devices comprises a first storage device manufactured by a first manufacturer and a second storage device manufactured by a second manufacturer, the first storage device being a solid state drive ("SSD"), the first storage device having a first management interface specific to the first manufacturer and an InfiniB and communication interface, the second storage device being a spindle-disk subsystem having a second management interface specific to the second manufacturer and a Fibre Channel communication interface.

9. The method of claim 8, wherein the API comprises a framework that generalizes differing storage management interfaces, and wherein provisioning storage comprises:
   communicating, via the API, with the first management interface on the first storage device; and
   communicating, via the API, with the second management interface on the second storage device.

10. The method of claim 1, wherein the set of information comprises:
    a host identifier to identify the host computer;
    a logical unit number ("LUN") alias to identify provisioned storage;
    a LUN size indicating a desired size of the provisioned storage; and
    at least one performance criterion for the provisioned storage.

11. The method of claim 10, wherein provisioning storage comprises:
    creating, with the API, the LUN in the cloud storage array;
    assigning, with the API, the LUN to the host computer; and registering, via the API, the LUN with the host computer, such that the host computer can address and use the provisioned storage.

12. The method of claim 11, wherein assigning the LUN to the host computer comprises:
mapping the LUN to a target port of the cloud storage array; and
masking the LUN to a world wide name ("WWN") for the host computer.

13. The method of claim 1, further comprising:
determining, with the provisioning computer, whether the host computer is registered to the API; and
based on a determination that the host computer is not registered with the API, registering the host computer with the API, wherein registering the host computer with the API comprises:
defining, in the API, an alias of the host computer;
defining, in the API, an Internet protocol ("IP") address of the host computer; and
defining, in the API, a set of credentials of a management identity on the host computer.

14. The method of claim 1, wherein accessing the host computer comprises:
accessing, with the API, a registration of the host computer, the registration comprising an alias for the host computer, an Internet protocol ("IP") address of the host computer, and a set of credentials of a management identity on the host computer;
communicating, with the API, with the host computer at the IP address of the host computer; and
authenticating, with the API, the host computer using the set of credentials.

15. The method of claim 1, further comprising:
accessing, with the API, a storage model of the cloud storage array.

16. The method of claim 1, wherein the API comprises a web service.

17. The method of claim 1, further comprising:
providing a web portal for a customer to request storage provisioning, wherein receiving the set of information comprises receiving at least a portion of the set of information via the web portal.

18. The method of claim 1, wherein the host computer serves as a container for a plurality of guest computers, and wherein provisioning storage comprises provisioning storage for one or more of the guest computers.

19. An apparatus for providing storage within a cloud-computing environment to meet storage performance criteria of a customer, the apparatus comprising:
a non-transitory computer readable medium having encoded thereon a set of instructions executable by a storage provisioning computer to perform one or more operations, the set of instructions comprising:
instructions for providing an application programming interface ("API") for provisioning cloud storage for a host computer;
instructions for receiving, via the API, a set of information defining storage needs of the host computer;
instructions for determining a storage type based on the storage needs of the host computer, the storage type including a performance dimension, a capacity dimension, and a cost dimension;
instructions for accessing the host computer with the API; and
instructions for provisioning storage, with the API, from a cloud storage array to allocate a portion of the cloud storage array to the host computer, the portion of the cloud storage array having the determined storage type, wherein the cloud storage array comprises multiple tiers of storage, each tier of storage having a different performance capability, wherein the allocated portion of the cloud storage array comprises at least a first sub-portion from a first tier of the cloud storage array and a second sub-portion from a second tier of the cloud storage array;
wherein at least one of the first sub-portion from the first tier of the cloud storage array or the second sub-portion from the second tier of the cloud storage array had not previously been provisioned to the host computer, and the at least one of the first sub-portion or the second sub-portion is newly provisioned to the host computer without rebooting the host computer.

20. A storage provisioning system for providing storage within a cloud-computing environment to meet storage performance criteria of a customer, the storage provisioning system comprising:
one or more processors; and
a non-transitory computer readable medium in communication with the one or more processors, the computer readable medium having encoded thereon a set of instructions executable by the computer system to perform one or more operations, the set of instructions comprising:
instructions for providing an application programming interface ("API") for provisioning cloud storage for a host computer;
instructions for receiving, via the API, a set of information defining storage needs of the host computer;
instructions for determining a storage type based on the storage needs of the host computer, the storage type including a performance dimension, a capacity dimension, and a cost dimension;
instructions for accessing the host computer with the API; and
instructions for provisioning storage, with the API, from a cloud storage array to allocate a portion of the cloud storage array to the host computer, the portion of the cloud storage array having the determined storage type, wherein the cloud storage array comprises multiple tiers of storage, each tier of storage having a different performance capability, wherein the allocated portion of the cloud storage array comprises at least a first sub-portion from a first tier of the cloud storage array and a second sub-portion from a second tier of the cloud storage array;
wherein at least one of the first sub-portion from the first tier of the cloud storage array or the second sub-portion from the second tier of the cloud storage array had not previously been provisioned to the host computer, and the at least one of the first sub-portion or the second sub-portion is newly provisioned to the host computer without rebooting the host computer.

* * * * *